United States Patent [19]

Stenfort

[11] Patent Number: 6,023,387
[45] Date of Patent: Feb. 8, 2000

[54] METHOD AND APPARATUS FOR DETERMINING SECTOR ADDRESSES FROM MEDIA HAVING DATA WRITTEN IN A HEADERLESS FORMAT

[75] Inventor: Ross J. Stenfort, Los Altos, Calif.

[73] Assignee: Adaptec, Inc., Milpitas, Calif.

[21] Appl. No.: 08/926,303

[22] Filed: Sep. 5, 1997

[51] Int. Cl.⁷ ........................................................ G11B 5/09
[52] U.S. Cl. ................................................. 360/53; 360/48
[58] Field of Search .................................... 360/46, 48, 53; 369/53, 59

[56] References Cited

U.S. PATENT DOCUMENTS

| | | |
|---|---|---|
| 4,504,948 | 3/1985 | Patel .......................................... 371/38 |
| 5,717,535 | 2/1998 | French et al. .............................. 360/53 |

OTHER PUBLICATIONS

Stephen G. Wilson, "Digital Modulation and Coding", 1996, Ch. 5, pp. 470–472, Prentice–Hall, New Jersey.

Shu Lin and Daniel J. Costello, Jr., "Error Control Coding Fundamentals and Applcations", Ch. 6, pp. 167–174, Published 10–82, © 1983, Prentice–Hall, Englewood Cliff, New Jersey.

Unknown, "Chapter 1, Introduction", from *The History of Error–Control Coding*, Date Not Available.

N. Glover and T. Dudley, "Practical Correction Design for Engineers", 1991, Cirrus Logic, Inc., CO, Rev. 2nd Ed.

W.W. Peterson and E.J. Weldon, Jr., "Error–Correcting Codes", 1972, (12th printing 1994), Mass. Inst. of Technology, pp. 131–136.

E. van Straten, "Harddrive Related Terms and Tricks", Apr. 16, 1997, pp. 1–15, Quantum Corporation.

*Primary Examiner*—W. Chris Kim
*Attorney, Agent, or Firm*—Martine Penilla & Kim, LLP

[57] ABSTRACT

Disclosed is a method for determining an exact address of sectors retrieved from a media that is formatted in a headerless format. The method includes the acts of requesting a desired sector. Associating a seed value to the desired sector. Retrieving an initial sector from the media in response to the requested desired sector. Calculating an error detection and correction over the initial sector and the seed value that is associated with the desired sector to produce a seed error pattern at a seed location. The method further includes, in one embodiment, the act of performing a logical XOR operation between the seed error pattern and the seed value to produce an exact address of the initial sector that is retrieved from the media. Once the exact address of the initial sector is ascertained, a transition may be made to the desired sector. On the other hand, the data beginning at the received sector may be used.

30 Claims, 11 Drawing Sheets

METHOD AND APPARATUS FOR DETERMINING SECTOR ADDRESSES FROM MEDIA HAVING DATA WRITTEN IN A HEADERLESS FORMAT

BACKGROUND OF THE INVENTION

1. Field of the Invention

This invention relates generally to hard disk drives, and more particularly to methods for increasing the density of data stored on a media while maintaining precise positioning capabilities.

2. Description of the Related Art

Hard disk drives are common in most modern computer systems. Generally, a hard disk is used as a storage unit for data that is not currently being used by a CPU, but may be periodically accessed. Recently, there has been a growing demand for increased storage space on hard disks. This demand is due in part to the increased complexity and size of computer programs and the need to archive an increased number of data files, e-mail files, graphics files, etc.

Figure 1A:
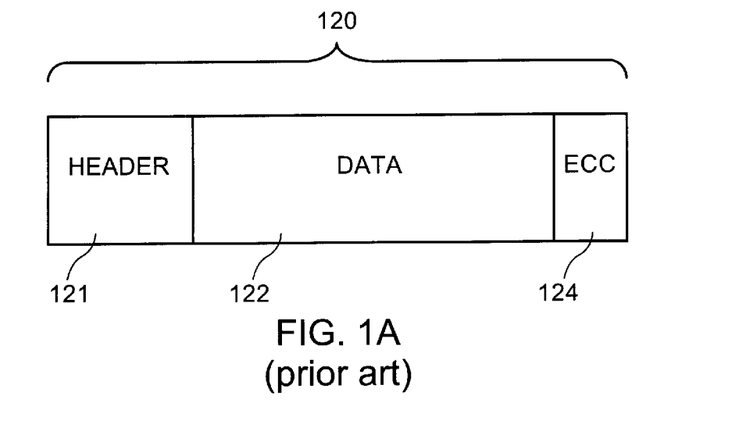
FIGS. 1A through 1C illustrate prior art techniques used to store data on a media in a headerless format.

To enable the storage of data onto a hard disk, the manufacture is generally required to format the hard disk. Hard disks are generally formatted to have a plurality of circular tracks that are divided into sectors. By way of example, FIG. 1A shows an exemplary sector 120 that may be repeated around a particular track. In this example, the sector 120 is shown having a header section 121, a data section 122 and an error correction code (ECC) section 124. As is well known in the art, the header section may be used to store an exact sector address, for example, of sector 120. In this manner, the writing or reading mechanism used by a hard disk unit will be able to identify the exact address of a sector. Although the inclusion of the header section 121 for address identification is quite useful and well known, the demand for increased storage density on hard disk media has driven designers and manufactures to modify the formatting of the media tracks.

Figure 1B:
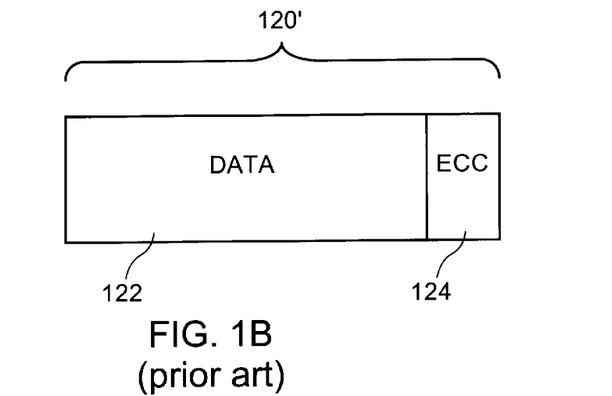
Figure 1C:
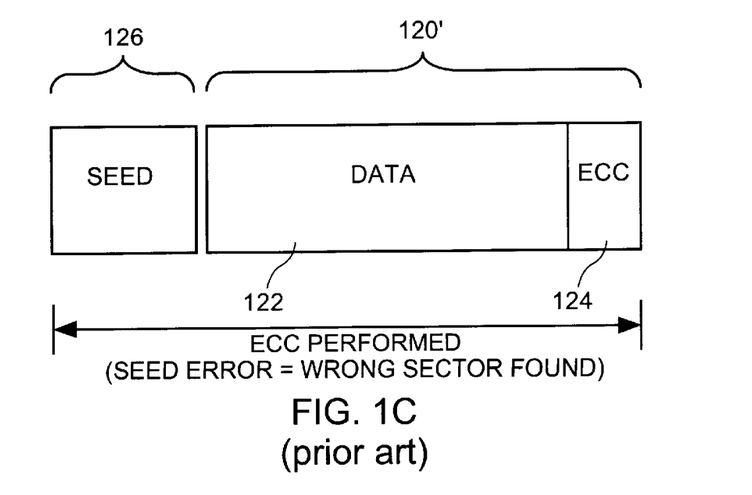

For example, FIG. 1B shows a more compact sector 120' having a data section 122 and an ECC section 124. Clearly, compact sector 120' will enable the storage of substantially more data in a given media because the header section 121 of sector 120 is no longer used. Although more data can be stored on the media without the inclusion of headers, identifying a correct desired sector will become more difficult than before. Several techniques are typically used to enable the identification of a correct desired sector. One technique utilizes what are known as "seed bytes" to identify the address of each sector. Before the data sector 120' is written to the media, an ECC calculation is performed over the ECC section 124, the data section 122 and a seed section 126. Once the ECC calculation is performed, only the data section 122 and the ECC section 124 are written to the media in the form of sector 120'.

Now that the data is written to the media, a read operation to locate a desired sector having a particular address is performed. The request for a particular desired sector address is generally triggered by a host that asks for the retrieval of a particular sector which will have an associated seed byte (e.g., seed byte 55). The hard disk drive circuitry and mechanical arm (not shown) then attempts to find the approximate location of the desired sector by performing well known indexing, and sector pulsing for each revolution of the media. Other techniques, such as servo split identification may also be used to approximately locate the desired sector, however, the inclusion for servo splits will require additional space on the media, which is counter productive to increasing storage space through headerless sectors.

Once the disk drive circuitry locates a sector that it believes to approximate the location of the desired sector, an ECC computation will be performed over the retrieved ECC section 124, data section 122 and a seed section 126 for the desired sector (i.e., seed byte 55). However, it should be noted that the seed section 126 is not stored on the media, rather, it is provided once the host requests the desired sector. If one of the seed byte locations is found to be in error (i.e., by producing a "seed error") after the ECC calculation, then the retrieved sector and the desired sector will not be the same. In other words, the disk drive will only know that it did not find the requested sector and will therefore be required to continually repeat the search until the retrieved sector and the desired sector match. Although an increased data storage density is achieved by storing data on a media without headers, positioning and retrieval of a desired sector becomes a sluggish and repetitive task that may be impact the long term reliability of a disk drive system.

In view of the foregoing, there is a need for a method and apparatus that enables high density data storage while providing rapid and precise positioning to a desired sector in a given media.

SUMMARY OF THE INVENTION

Broadly speaking, the present invention fills these needs by providing a method and apparatus for accurately positioning to a desired sector in a media that has data stored thereon in a headerless format. It should be appreciated that the present invention can be implemented in numerous ways, including as a process, an apparatus, a system, a device, a method, or a computer readable medium. Several inventive embodiments of the present invention are described below.

In one embodiment, a method for determining an exact address of sectors retrieved from a media that is formatted in a headerless format is disclosed. The method includes the acts of requesting a desired sector. Associating a seed value to the desired sector. Retrieving an initial sector from the media in response to the requested desired sector. Calculating an error detection and correction over the initial sector and the seed value that is associated with the desired sector to produce a seed error pattern. The method further includes the act of performing a logical XOR operation between the seed error pattern and the seed value to produce an exact address of the initial sector that is retrieved from the media. Once the exact address of the initial sector is ascertained, a transition may be made to the desired sector address.

In another embodiment, a hard disk drive having a media for storing a plurality of sectors that include a data portion and an ECC portion is disclosed. The hard disk drive includes a disk drive controller configured to receive a request for a desired sector that has an associated seed value that corresponds to a desired sector address in the media. A microcontroller that is configured to command a motor control to retrieve an initial sector from the media in response to the request for the desired sector from disk drive controller. The hard disk drive further includes an error detection and correction controller that is part of the disk drive controller. The error detection and correction controller is configured to perform an error detection and correction over the initial sector and the seed value to produce a seed error that is transformed into a seed error pattern. The error detection and correction controller is further configured to perform an XOR operation between the seed value and the seed error pattern to produce an exact address of the initial sector that is retrieved from the media. Once the exact address of the initial sector is ascertained, a transition may be made to the desired sector.

In yet a further embodiment, a computer readable media containing program instructions for determining an exact address of sectors retrieved from a media that is formatted in a headerless format is disclosed. The computer readable media includes program instructions for requesting a desired sector. Program instructions for associating a seed value to the desired sector. Program instructions for retrieving an initial sector from the media in response to the requested desired sector. Program instructions for calculating an error detection and correction over the initial sector and the seed value that is associated with the desired sector to produce a seed error pattern. The computer readable media further includes program instructions for performing a logical XOR operation between the seed error pattern and the seed value to produce an exact address of the initial sector that is retrieved from the media. Once the exact address of the initial sector is ascertained, a transition may be made to the desired sector.

In still a further embodiment, a computer readable media containing program instructions to be executed on a central processing unit for determining an exact address of sectors retrieved from a media that is formatted in a headerless format is disclosed. The central processing unit is provided with syndrome values of a seed error that is produced when an initial sector that is other than a desired sector is retrieved from the media. The central processing unit is also provided with a seed value that is associated with the desired sector. The computer readable media includes program instructions for receiving the provided syndrome values and the seed value. In a variation of this embodiment, seed, data and ECC bytes may be provided to the central processing unit to enable an internal computation of the syndrome. The computer readable media further includes program instructions for calculating an error detection and correction over the initial sector that includes a data portion and an ECC portion and the provided seed value that is associated with the desired sector to produce a seed error pattern. Furthermore, the computer readable media includes program instructions for performing a logical XOR operation between the seed error pattern and the seed value to produce an exact address of the initial sector that is retrieved from the media.

In another embodiment, a computer readable media containing program instructions to be executed on a central processing unit for determining an exact address of sectors retrieved from a media that is formatted in a headerless format is disclosed. A data portion and an ECC portion of an initial sector, and a seed value that is associated with the desired sector are made accessible to the central processing unit. The computer readable media includes program instructions for calculating syndrome values using the data portion and the ECC portion of an initial sector. Program instructions for calculating an error detection and correction over the initial sector that includes the data portion and the ECC portion, and the seed value that is associated with the desired sector to produce a seed error pattern. The computer readable media further including program instructions for performing a logical XOR operation between the seed error pattern and the seed value to produce an exact address of the initial sector that is retrieved from the media.

In one embodiment, a method for determining an exact address of a sector retrieved from a headerless media is disclosed. The method includes retrieving a sector having a data section and an ECC section from the media. Performing an error detection and correction over the sector. Producing an error from the performed error detection and correction. Calculating an error location for the produced error. The method further includes calculating an error pattern from the calculated error location. Wherein the error pattern is the exact address of the sector retrieved from the headerless media.

Advantageously, the present invention provides a solution to the long felt need of ascertaining an exact address of a sector that is retrieved from a media (e.g., hard drives, optical drives, etc.) that is formatted in a headerless manner. Now that it is possible to quickly ascertain the exact address of a sector through a simple logical XOR operation between a seed error pattern and a seed value of a desired sector, a larger amount of data may be stored in conventional headerless media without bearing the cost of being unable to ascertain a retrieved sector's address. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for a method and apparatus that accurately positions a disk drive to a desired sector in a media that has data stored thereon in a headerless format. In the following description, numerous specific details are set forth in order to provide a thorough understanding of the present invention. It will be obvious, however, to one skilled in the art, that the present invention may be practiced without some or all of these specific details. In other instances, well known process operations have not been described in detail in order not to unnecessarily obscure the present invention.

Figure 2:
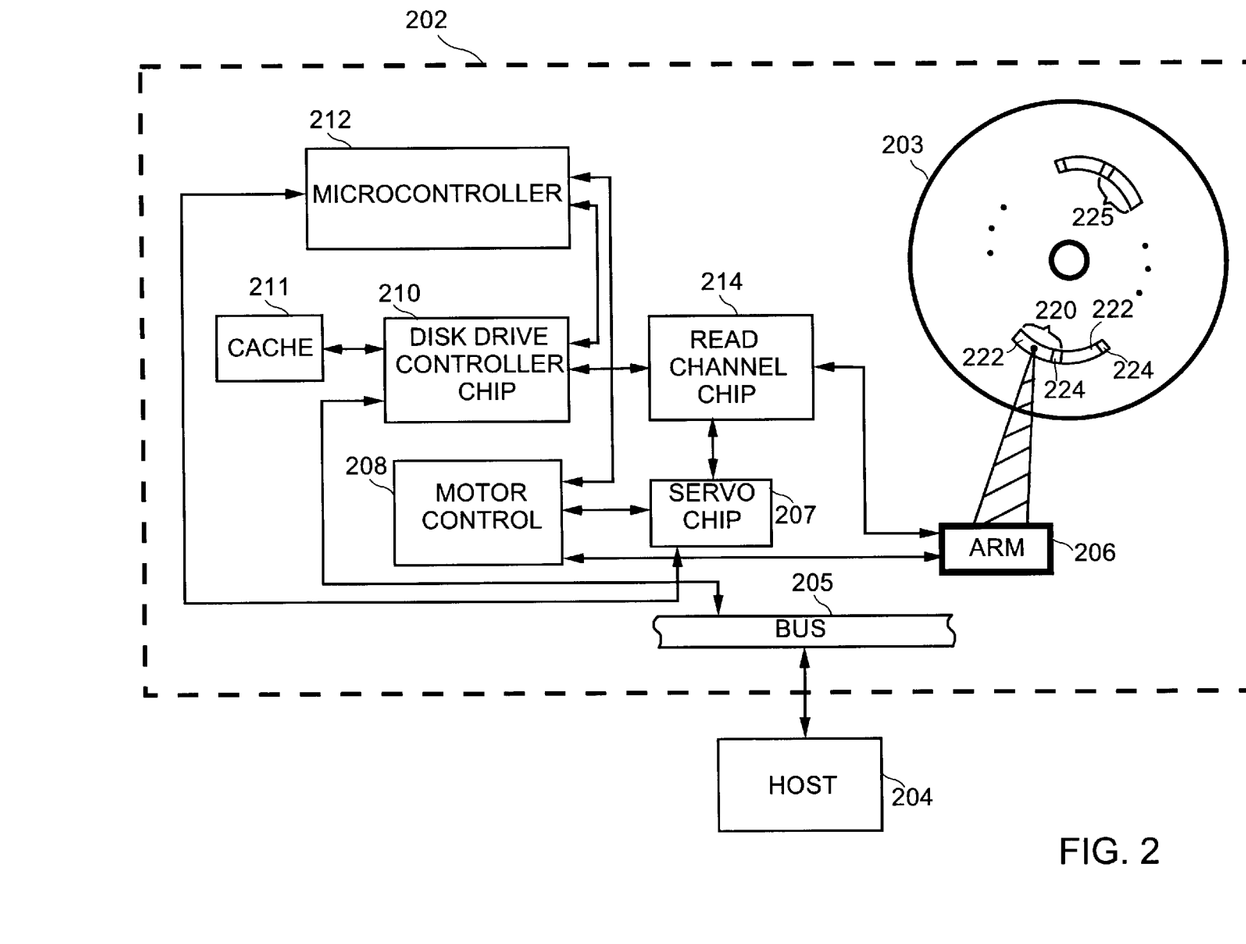
FIG. 2 is a block diagram of a hard disk drive system having a hard disk media and associated circuitry in accordance with one embodiment of the present invention.

FIG. 2 is a block diagram of a hard disk drive system having a hard disk media 203 and associated circuitry in accordance with one embodiment of the present invention. Generally, the hard disk drive system 202 is shown coupled to a host 204 via a bus 205. Host 204 may be any suitable computer system that requires access to a hard disk media 203 for writing or reading data therefrom. Bus 205 may be any suitable bus, such as an ATA bus, a SCSI bus, an IEEE 1394 or any other bus that is suitable for transferring data back and forth between the hard disk drive system 202 and the host 204. In this embodiment, bus 205 is shown in bi-directional communication with a disk drive controller chip 210 that is responsible for controlling the processing that is configured to identifying an exact address of a sector retrieved by an arm 206 from the hard disk media 203. In this example, a head of the arm 206 is shown positioned to a sector 220 having a data portion 222 and an ECC portion 224 that has been formatted onto the hard disk media 203. Disk drive controller chip 210 is also shown in communication with a cache memory 211 that may be used for locally storing sectors being read to or from the hard disk media 203 before being transferred to and from the host 204.

In operation, when the host 204 requests a desired sector (e.g., sector 225) from the hard disk media 203, disk drive controller chip 210 will communicate with a microcontroller 212 that in turn commands a servo chip 207 to commence an approximate search to the desired sector within the hard disk 203. In one embodiment, the servo chip 207 will communicate to a motor control 208 that is well suited to communicate with the arm 206 that identifies the approximate location (i.e., sector 220) of the desired sector 225 within the hard disk media 203.

Preferably, the servo chip 207 is well suited to index the hard disk media 203 and then begin counting sector pulses to identify the approximate location of the desired sector within hard disk 203. Once arm 206 identifies an approximate sector shown as sector 225 in FIG. 2, an analog representation of sector 225 is passed to a read channel chip 214 where an analog-to-digital conversion is performed. Once the data is in a digital format, the data is transferred to the disk drive controller chip 210. Once disk drive controller chip 210 has received the digital data associated with the found sector 225, an ECC computation is performed over the ECC section 224, the data section 222, and a seed value that is associated with the sector 225 that was requested by the host 204. As shown in this case, the sector that was found by the arm 206 is sector 220 and the desired sector is sector 225. Therefore, when the ECC computation produces a seed error, that seed error will essentially indicate that sector 225 was not retrieved, but rather, sector 220 was retrieved.

In one embodiment, the disk drive controller chip 210 will then perform a logical XOR calculation between the seed value associated with sector 225 (i.e., the sector requested by the host 204) and a seed error pattern that is produced by the disk drive controller chip 210. The logical XOR operation will therefore produce a new value that represents the exact address of the sector 220, which is the sector actually found by arm 206 during its approximate search. At this point, the disk drive controller chip may begin caching the sectors beginning with sector 220 and proceeding up to a final sector requested by the host 204.

In an alternative embodiment, once the disk drive controller chip 210 has identified the exact address of the found sector 220, the microcontroller 212, in conjunction with the disk drive controller chip 210, may incrementally count up or transition to the desired address of sector 225 before beginning the caching of the data to cache 211. However, if the desired address 220 had matched the initially retrieved sector address, then the sector data may be instantaneously transferred to the host via the bus 205.

Figure 3:
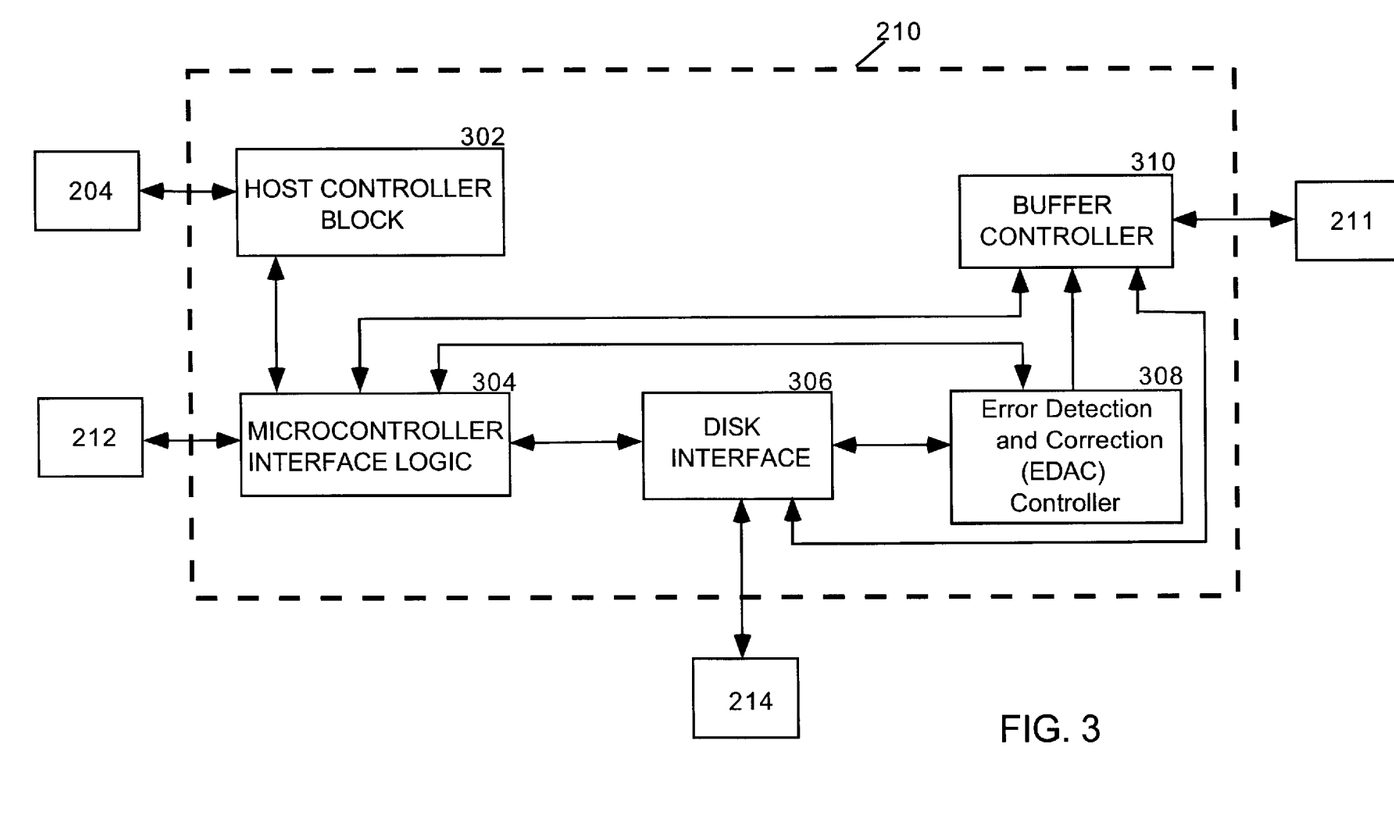
FIG. 3 shows a more detailed block diagram of a disk drive controller chip in accordance with one embodiment of the present invention.

FIG. 3 shows a more detailed block diagram of the disk drive controller chip 210 in accordance with one embodiment of the present invention. As shown, a host controller block 302 is therefore in communication with the host 204. Host controller block 302 is also in communication with a microcontroller interface logic 304. Microcontroller interface logic 304 is in turn in communication with the microcontroller 212 of FIG. 2, a buffer controller 310, an error detection and correction (EDAC) controller 308, and a disk interface 306.

The disk interface 306 is in communication with the read channel chip 214, the EDAC controller 308, and the buffer controller 310. EDAC controller 308 is also in communication with the buffer controller 310. buffer controller 310 is in turn in communication with cache 211. In one embodiment, buffer controller 310 may be any suitable memory device, such as an extended data out (EDO) RAM, a random access memory (RAM), Synchronous DRAM, Static RAM or any other suitable memory device.

As discussed above, the disk drive controller chip 210 is in charge of performing computations to ascertain the exact address of the sector 220 found by an arm 206. In one embodiment, the EDAC controller 308 is in charge of performing an ECC computation over the ECC region 224, the data region 222 and the seed bytes associated with the sector desired by the host 204. If a seed error is detected (i.e., signifying that the desired sector 225 was not found), then the EDAC controller 308 will perform a number of well known computations to produce an error pattern from the seed error.

Assuming that a seed error is produced from the ECC computation, the EDAC controller 308 will take the seed error and solve an error locator polynomial to produce a location. For more information on well known error locator polynomial operations, reference may be made to a book entitled "Error Control Systems for Digital Communication and Storage" by Stephen B. Wicker (1995), and a book entitled "Practical Error Correction Design for Engineers" by Neal Glover and Trent Dudly, pp. 168–70 (1991). These books are herein incorporated by reference. Once the error location is produced, an error pattern can be derived from the error location using either an error locator polynomial or well known syndrome equations.

Exemplary error locator polynomials and syndrome equations are shown below for completeness, however, it should be understood that multiple error cases besides those shown below may be used as well.

| Reed Solomon Single Error Case | | Reed Solomon Two Error Case | |
|---|---|---|---|
| (1) $\sigma(x) = \prod_{i=1}^{1} (x + a^L i) = x + \alpha$ | | (1) $\sigma(x) = \prod_{i=1}^{2} (x + a^L i) = x^2 + \sigma_1 x + \sigma_2$ | |
| Syndrome Equations | Newton's Identities | Syndrome Equations | Newton's Identities |
| (2) $S_0 = E$ | (6) $S_0 \cdot \sigma = S_1$ | (2) $S_0 = E_1 + E_2$ | (6) $S_0 \cdot \sigma_2 + S_1 \cdot \sigma_1 = S_2$ |
| (3) $S_1 = E\alpha^L$ | (7) $S_1 \cdot \sigma = S_2$ | (3) $S_1 = E_1\alpha^L 1 + E_2\alpha^L 2$ | (7) $S_1 \cdot \sigma_2 + S_2 \cdot \sigma_1 = S_3$ |
| (4) $S_2 = E\alpha^{2L}$ | (8) $S_2 \cdot \sigma = S_3$ | (4) $S_2 = E_1\alpha^{2L} 1 + E_2\alpha^{2L} 2$ | |
| (5) $S_3 = E\alpha^{3L}$ | | (5) $S_2 = E_1\alpha^{3L} 1 + E_2\alpha^{3L} 2$ | |

In one embodiment, in order to solve for a single error case, equation (6) can be solved for σ as shown below.

$$\sigma = S_1/S_0$$

Then σ can be substituted into equations (7) and (8) for verification. The location L is given as the log of σ from equation (1) and E is given as $S_0$ from equation (2). The same type of substitution can be done for the two error case by first solving the linear equations identified as Newton's inequalities and then plugging in the values into the non-linear syndrome equations. This will enable solving for L1, L2 and E1 and E2. For more information on solving error locator polynomials and syndrome equations, reference can be made to a book entitled "Practical Error Correction Design for Engineers" by Neal Glover and Trent Dudly, pp. 168–70 (1991), which was previously incorporated by reference herein.

The determined error pattern for the seed error that was computed by the EDAC controller 308 is then XOR'ed with the seed value that is associated with, for example, the sector 225 that was requested by the host 204. The result produced from the XOR operation will therefore yield the exact address of, for example, the identified sector 220. In one embodiment, the disk drive controller chip 210 may have been set to begin a transfer of sector data from the disk media 203 to the buffer controller 310 and cache 211 even before the exact address for sector 220 was even determined. In this manner, if sector 220 becomes the desired sector in a future request for a desired sector, that sector will already be stored in cache 211, thereby reducing any associated access latencies.

In another embodiment, the disk drive system 202 may be configured to only begin the reading from the hard disk media 203 after the address of the desired sector 225 has been found. Therefore, once the exact address of the found sector 220 has been ascertained, the disk drive controller chip may request that the microcontroller 212 communicate with the motor control 208 to cause arm 206 to begin reading from the exact address of sector 225. In one embodiment, the arm 206 may move to the desired address of sector 225 by incrementing or decrementing from the exact address sector 220.

Figure 4:
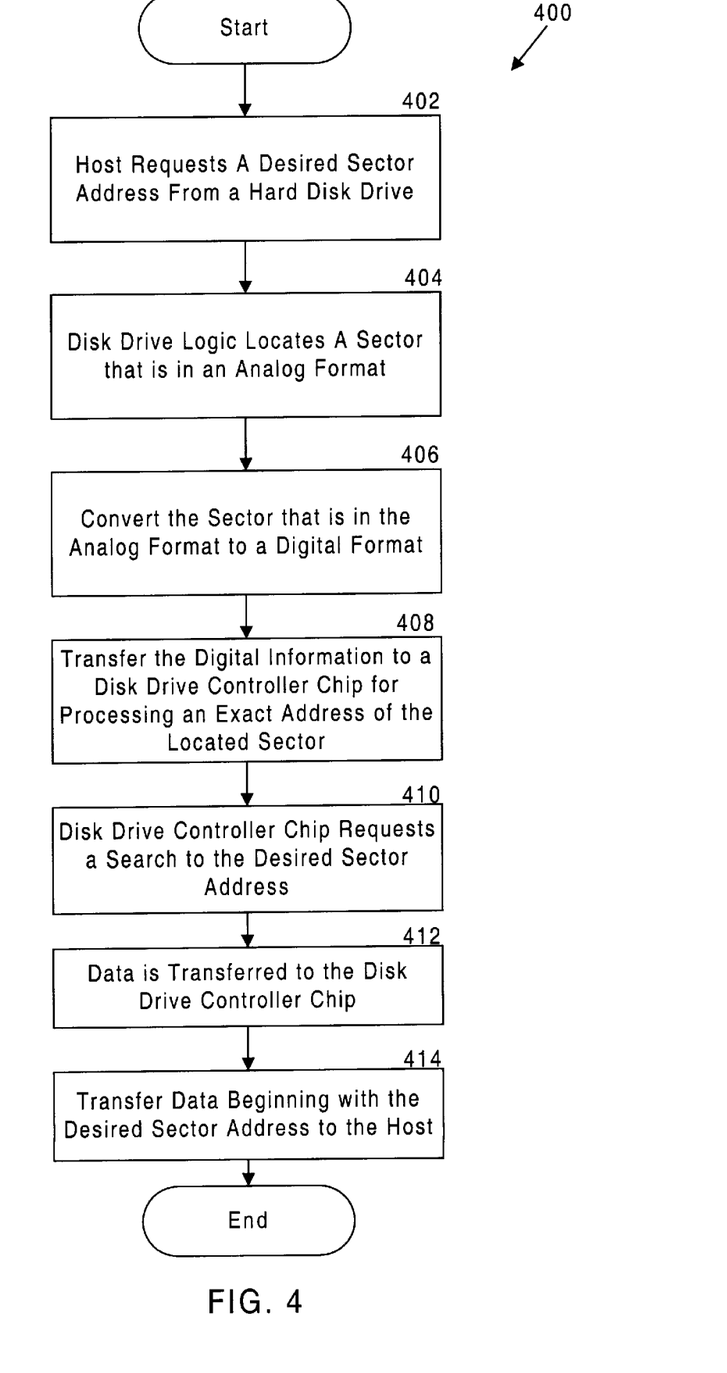
FIG. 4 is a flowchart diagram illustrating the preferred method operations associated with searching to a desired sector address in accordance with one embodiment of the present invention.

FIG. 4 is a flowchart diagram illustrating the preferred method operations associated with searching to a desired sector address in accordance with one embodiment of the present invention. The method begins at an operation 402 where a host requests a desired sector address from a hard disk drive. As described with reference to FIG. 2 above, the host 204 may communicate via a bus 205 to the hard disk drive system 202 to commence the process of identifying an exact address for a sector that is retrieved by the arm 206 from the media 203 using either servo splits or indexing and sector pulsing. The method then proceeds to an operation 404 where the disk drive logic circuitry locates a sector (i.e., sector 220) that is currently in the form of an analog signal.

Once the analog signal is retrieved from the media 203, the method proceeds to an operation 406 where the sector information is converted to a digital signal that is well suited for processing through the digital circuitry of the hard disk drive system 202. The method then proceeds to an operation 408 where the digital information is transferred to a disk drive controller chip 210 for processing an exact address of the located sector. Once the exact address of the located sector has been identified, the method will proceed to an operation 410 where the disk drive controller chip 210 will request a search to the desired sector address (e.g., of a desired sector 225), if the exact address is not the same as the desired sector address. In other words, if no seed error is found when the aforementioned ECC calculation is performed over the ECC region, the data region, and the seed bytes, then the located sector is actually the desired sector.

However, in one embodiment of the present invention, if the located sector (i.e., sector 220) is not the desired sector (i.e., sector 225), then a search to the desired sector may be performed by incrementally shifting to sector 225. Of course, a search may also be performed by decrementing to the desired sector. In either case, once the exact address is ascertained, a rapid transition may be made to the desired address. Once the search to the desired sector address has been completed in operation 410, the method will proceed to an operation 412 where the data is transferred to the disk drive controller chip 210. Once the disk drive controller chip 210 has received the transferred data in operation 412, the method will proceed to an operation 414 where data beginning with the desired sector address is transferred to the host. Once the transfer is complete in operation 414, the method will end.

Figure 5:
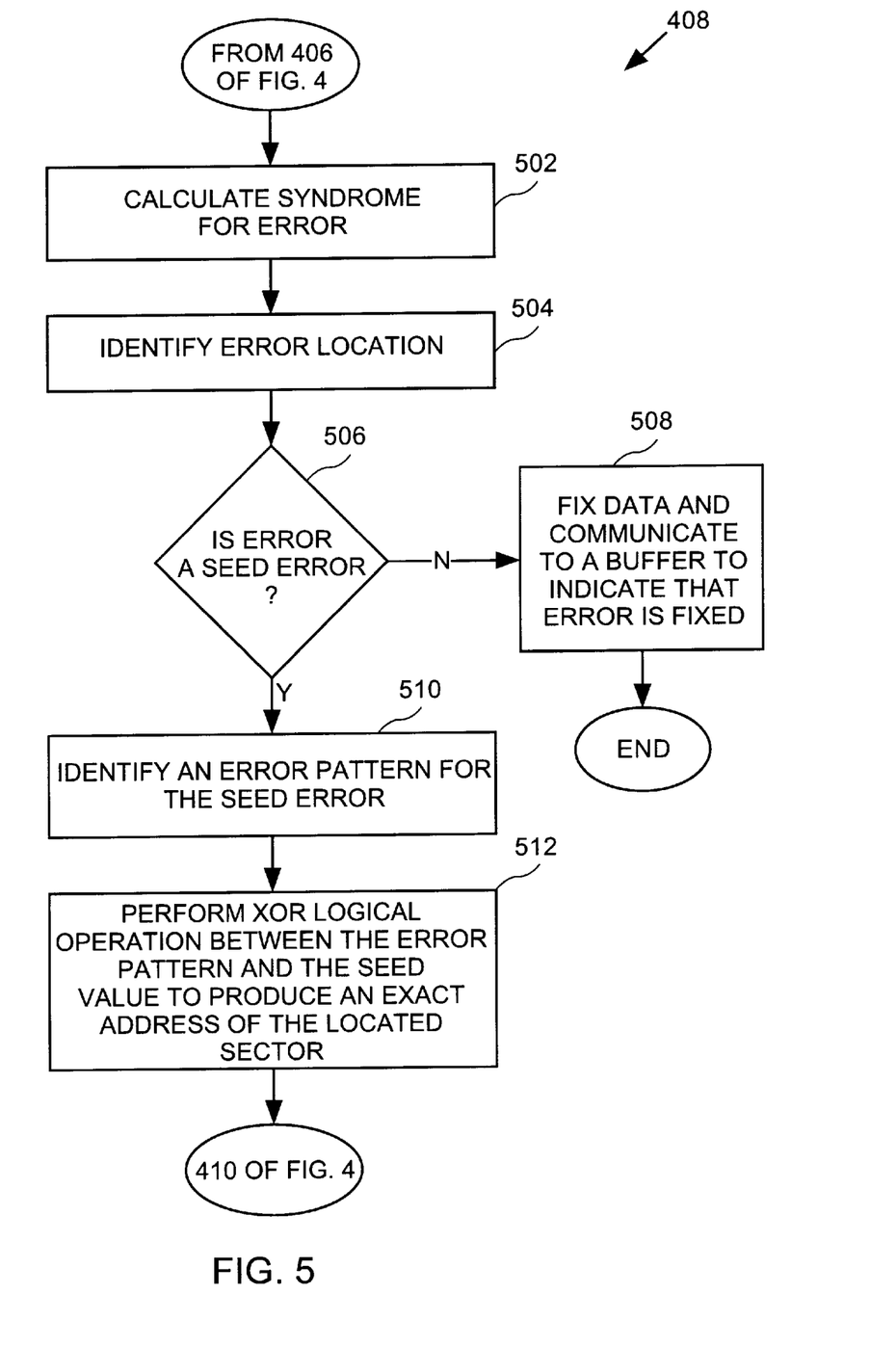
FIG. 5 is a more detailed flowchart diagram of the processing performed in an operation of FIG. 4 to derive the exact address of the located sector in accordance with one embodiment of the present invention.

FIG. 5 is a more detailed flowchart diagram of the processing performed within operation 408 of FIG. 4 to derive the exact address of the located sector in accordance with one embodiment of the present invention. As shown, the method proceeds from operation 406 of FIG. 4 to an operation 502 where syndromes are computed for an error produced during an ECC calculation over the ECC region 224, the data region 222 and a seed value of the desired sector. Next, assuming an error is detected, an error locator polynomial is solved to find the error location or locations. In general, the error location may be associated with either the data section or ECC section of a sector found on the media, or the seed bytes of the found sector.

Once the error location has been identified in operation 504, the method will proceed to a decision operation 506 where it is determined whether the error is a seed error. In one embodiment, to determine if the error location represents a seed error, the disk drive controller chip 210 may refer to an ECC code word containing an information section and a check bytes section. Once reference is made to the ECC code word, the disk drive controller chip 210 may refer to an assigned seed location in the information section to determine if the error location is a seed error. If the error location is assigned to a seed value in the information section of the ECC code word, then the method will proceed to an operation 510 where the error pattern for the seed error is identified. As mentioned above, the error pattern for the seed error may be determined in any number of well known ways, which may include, solving an error location polynomial or syndrome equations.

Once the error pattern for the seed value is identified, the method will proceed to an operation 512 where a logical XOR operation is performed between the identified error pattern at that location and the seed value at that location that is associated with the desired sector that was requested by the host 204. Once the exact address of the located sector has been determined, the method will proceed to operation 410 of FIG. 4. Referring back to decision operation 506, if it was determined that the error location was not a seed error (i.e., none of the error locations correspond to seed values), the method would proceed to operation 508. Of course, if no seed error is produced, then the desired sector address will be assumed to have matched the exact address of the found sector. Therefore, if the error is a data error, the data is fixed and then communicated to a buffer to signal that any such data errors have been fixed. Once the data errors are fixed, the method will end.

Figure 6:
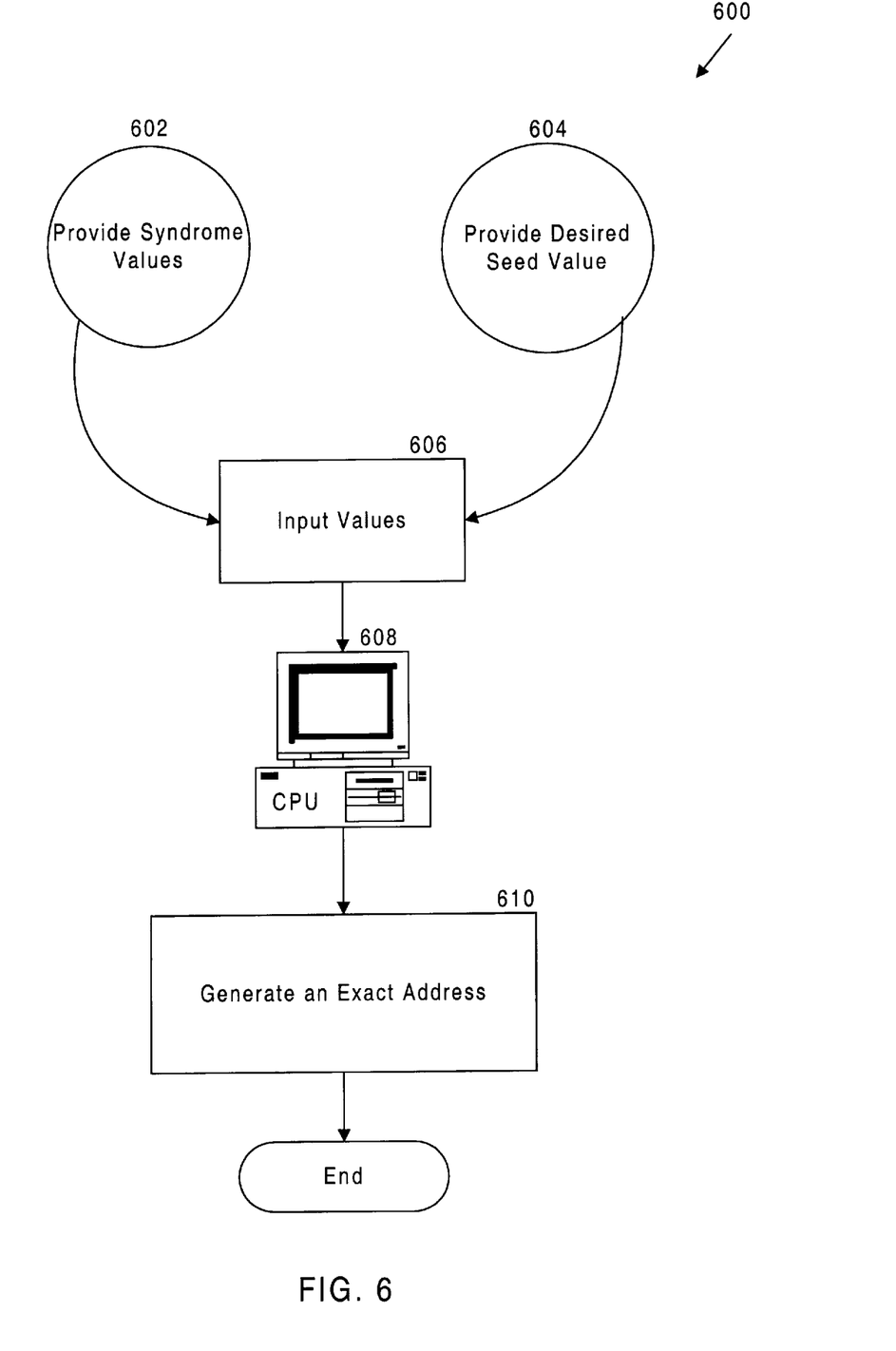
FIG. 6 is a flow diagram illustrating the high level software functional operations that are performed in a machine using software code to generate an exact address based on input values in accordance with an alternative embodiment of the present invention.

FIG. 6 is a flow diagram illustrating the high level software functional operations 600 that are performed in a machine using software code to generate an exact address based on input values in accordance with an alternative embodiment of the present invention. As shown, syndrome values 602 and a desired seed value 604 are provided as input values 606 to a CPU 608 for execution. Alternatively, the CPU 608 may itself perform the necessary calculations to produce the syndrome values by providing the CPU 608 with the data portion 222 and the ECC portion 224 of a sector identified from a media (e.g., sector 220 of FIG. 2). Once these parameters are obtained for the identified sector, a syndrome calculation may be performed to produce syndrome values. In either case, the CPU 608 is well suited to take the input values 606 and thereby generate an exact address in operation 610 of the sector identified from the media. In one embodiment, the generated exact address may be presented to the user of the software in the form of raw data that may be used in the calibration and/or design of hard disk drives or any other mass storage devices. Once the exact address is generated, the method will end.

Figure 7:
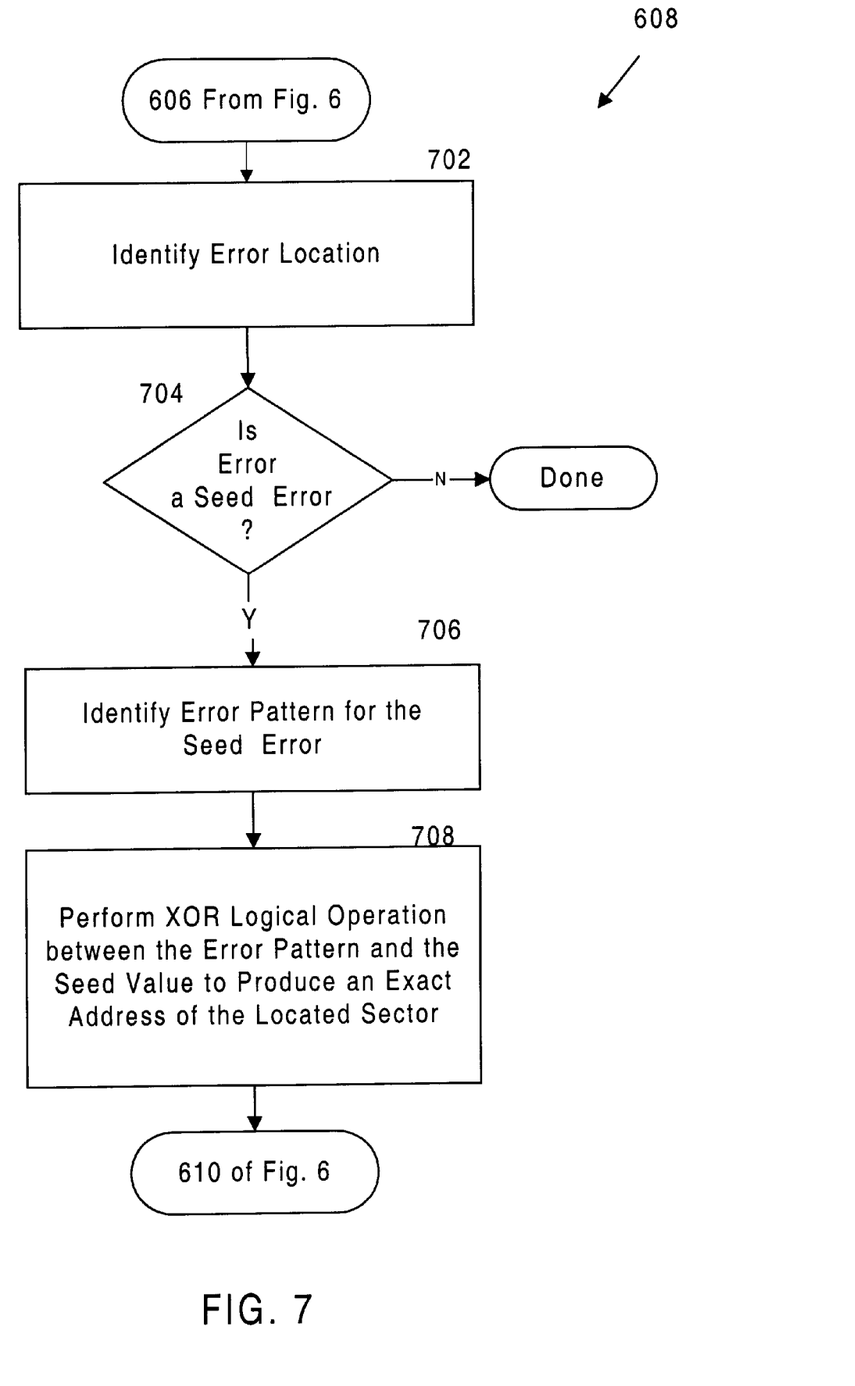
FIG. 7 is a more detailed flowchart diagram illustrating the method operations performed within a central processing unit of FIG. 6 for identifying an exact address of an identified sector in accordance with the alternative embodiment of the present invention.

FIG. 7 is a more detailed flowchart diagram illustrating the method operations performed within the CPU 608 of FIG. 6 for identifying an exact address of an identified sector in accordance with the alternative embodiment of the present invention. As illustrated, the method resumes from operation 606 and begins at an operation 702 where an error location is identified. Once the error location is identified, the method will proceed to a decision operation 704 where it is determined if the error location is a seed error. If the error is not a seed error, the method will end.

On the other hand, if the error is a seed error, the method will proceed to an operation 706 where an error pattern for the seed error is identified. After the error pattern for the seed error is identified in operation 706, the method will proceed to an operation 708 where a logical XOR operation is performed between the identified error pattern (i.e., that is a product of the seed error), and the desired seed value 604. Once the XOR logical operation is performed, the method will proceed to operation 610 of FIG. 6 where the exact address of the identified sector is generated by the CPU 608.

It should be appreciated that the software implementation described with reference to FIGS. 6 and 7 are useful for performing calculations on a separate computer system or workstation that is used for the development of mass storage devices or to analyze their performance. For example, in the development of disk drives it may be useful to have a separate system to analyze errors such as seed errors as described above. Once the disk drive developer finds out the exact address of a sector retrieved in the separate workstation (i.e., an which produced a seed error), modifications may be made to the disk drive hardware or software to correct any such errors.

Figure 8A:
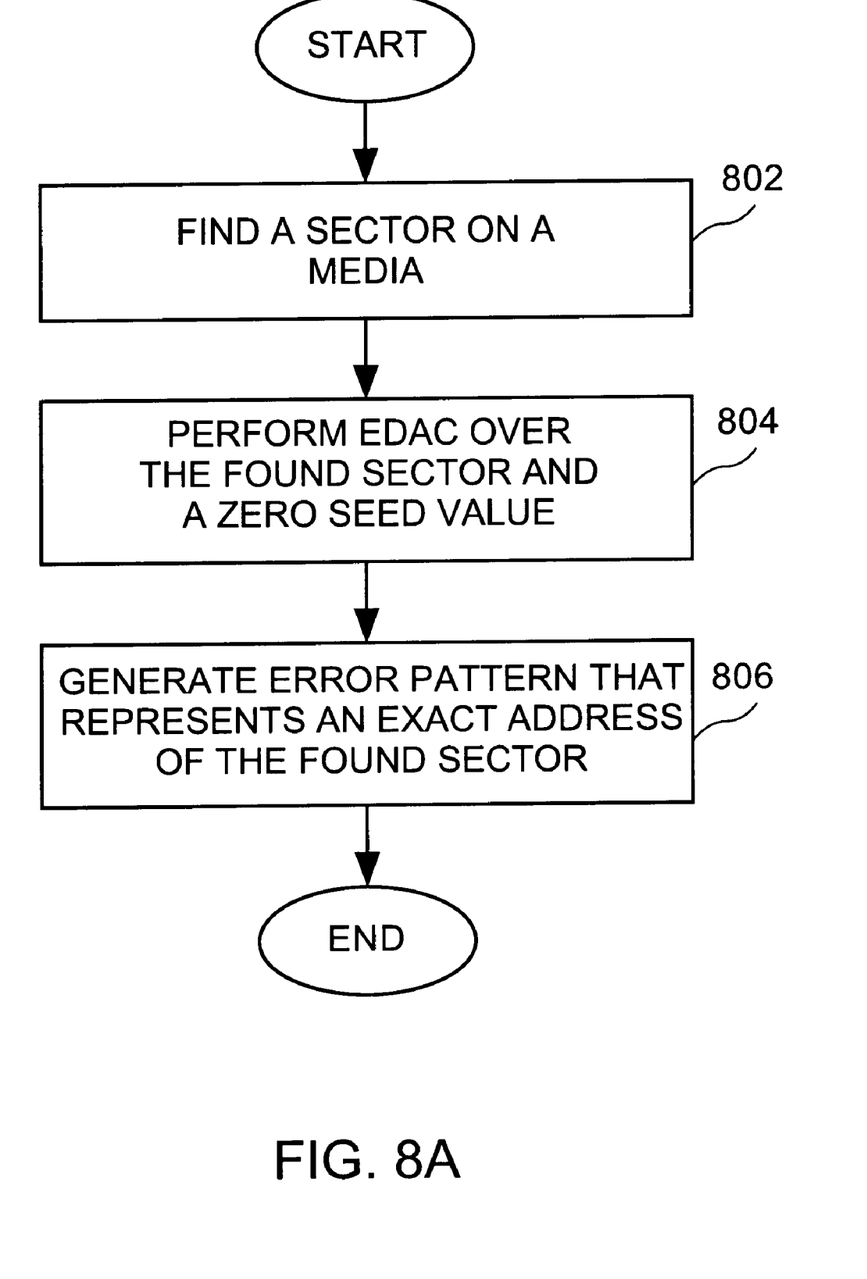
FIGS. 8A through 8C are flowchart diagrams of methods for finding exact addresses of found sectors in accordance with alternative embodiments of the present invention.

FIG. 8A is a flowchart diagram of a method in accordance with an alternative embodiment of the present invention. In this embodiment, the method begins at an operation 802 where a drive is instructed to find a sector on a media. The sector may be any sector on the media, for example, it may be the very first sector, the last sector, or a random middle sector on any track of a media. Once any arbitrary sector is found in operation 802, the method will proceed to an operation 804 where an error detection and correction (EDAC) unit performs an error detection and correction over the found sector (i.e., the sector having a data section and an ECC section) and a zero seed value. If the EDAC produces an error, that error may be determined to be associated with the zero seed value provided in operation 804.

Next, the method will proceed to an operation 806 where an error pattern is generated from the error produced by the EDAC of operation 804. Accordingly, the error pattern produced is actually an exact address for the sector found in operation 802. As can be appreciated, when an error is produced by the EDAC, the exact address of the found sector may be rapidly found by simply solving for the error pattern using the same or similar operations described in greater detail above.

Figure 8B:
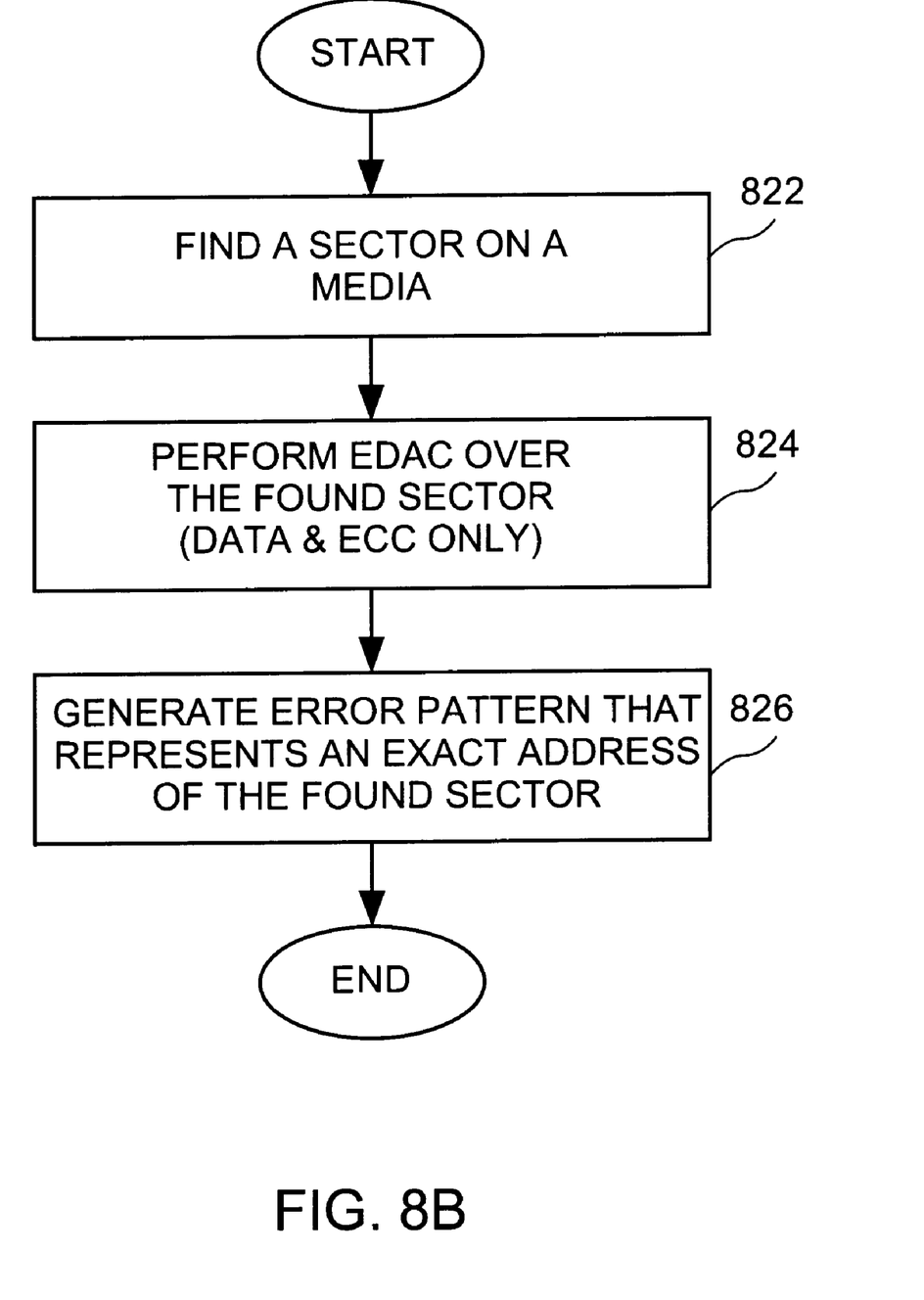

FIG. 8B is a flowchart diagram of a method in accordance with still another alternative embodiment of the present invention. In this embodiment, the method begins at an operation 822 where a drive is instructed to find a sector on a media. The sector may be any sector on the media, for example, it may be the very first sector, the last sector, or a random middle sector on any track of a media. Once any arbitrary sector is found in operation 822, the method will proceed to an operation 824 where an error detection and correction (EDAC) unit performs an error detection and correction over the found sector (i.e., only the sector data and ECC).

The method will then proceed to an operation 826 where a pattern is generated from an error produced by the EDAC of operation 824. Accordingly, the error pattern produced is actually an exact address for the sector found in operation 822. As can be appreciated, when an error is produced by the EDAC, the exact address of the found sector may be rapidly found by simply solving for the error pattern using the same or similar operations described in greater detail above.

Figure 8C:
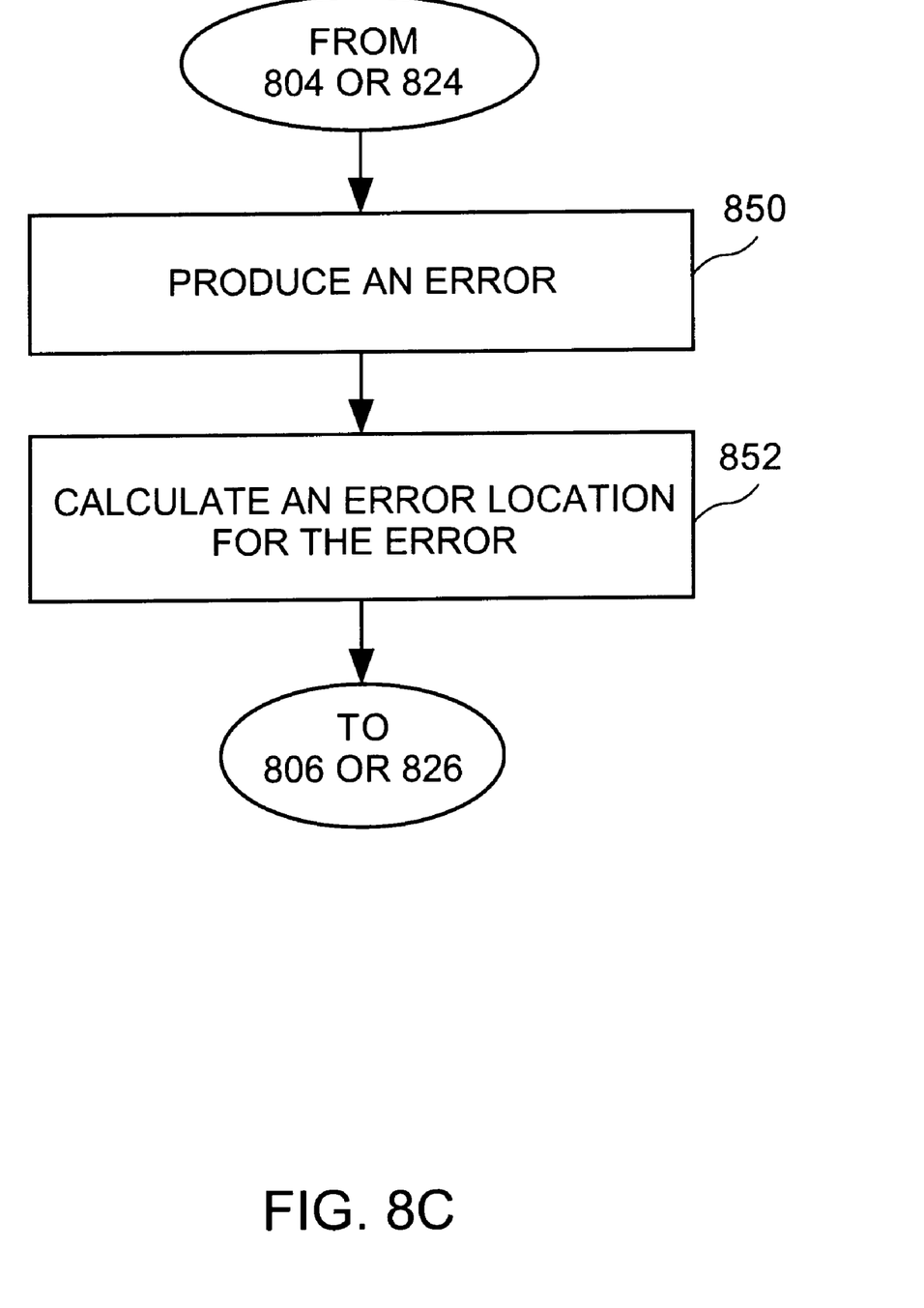

FIG. 8C is a more detailed flowchart diagram of intermediate operations performed between operations 804, 824 and 806, 826 in accordance with the alternative embodiments of the present invention. The method resumes at an operation 850, where an error is produced from the EDAC operations of 804 and 824. As described above, the error may be an error that is associated with the zero seed value or may be an error produced over the data/ECC sector alone as described in FIG. 8B. In any event, the method will proceed to an operation 852 where an error location is calculated using the error described above. By way of example, well known error locator polynomial type equations may be solved to ascertain the error location. Once the error location is produced, another error locator polynomial or syndrome equation may be used to solve for the error patterns that are generated in operations 806 and 826.

It should therefore be appreciated that an exact address of a found sector may be rapidly found, even without performing an XOR operation. In fact, once an error is detected, that error may be directly used to solve for the error pattern. Advantageously, once the error pattern is found, the exact address is also known because the error pattern is the exact address of the found sector.

The present invention may be implemented using any type of integrated circuit logic, state machines, or software driven computer-implemented operations. By way of example, a hardware description language (HDL) based design and synthesis program may be used to design the silicon-level circuitry necessary to appropriately perform the data and control operations in accordance with one embodiment of the present invention. By way of example, a VHDL® hardware description language available from IEEE of New York, N.Y. may be used to design an appropriate silicon-level layout. Although any suitable design tool may be used, another layout tool may include a hardware description language "Verilog®" tool available from Cadence Design Systems, Inc. of Santa Clara, Calif.

The invention may also employ various computer-implemented operations involving data stored in computer systems. These operations are those requiring physical manipulation of physical quantities usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 9:
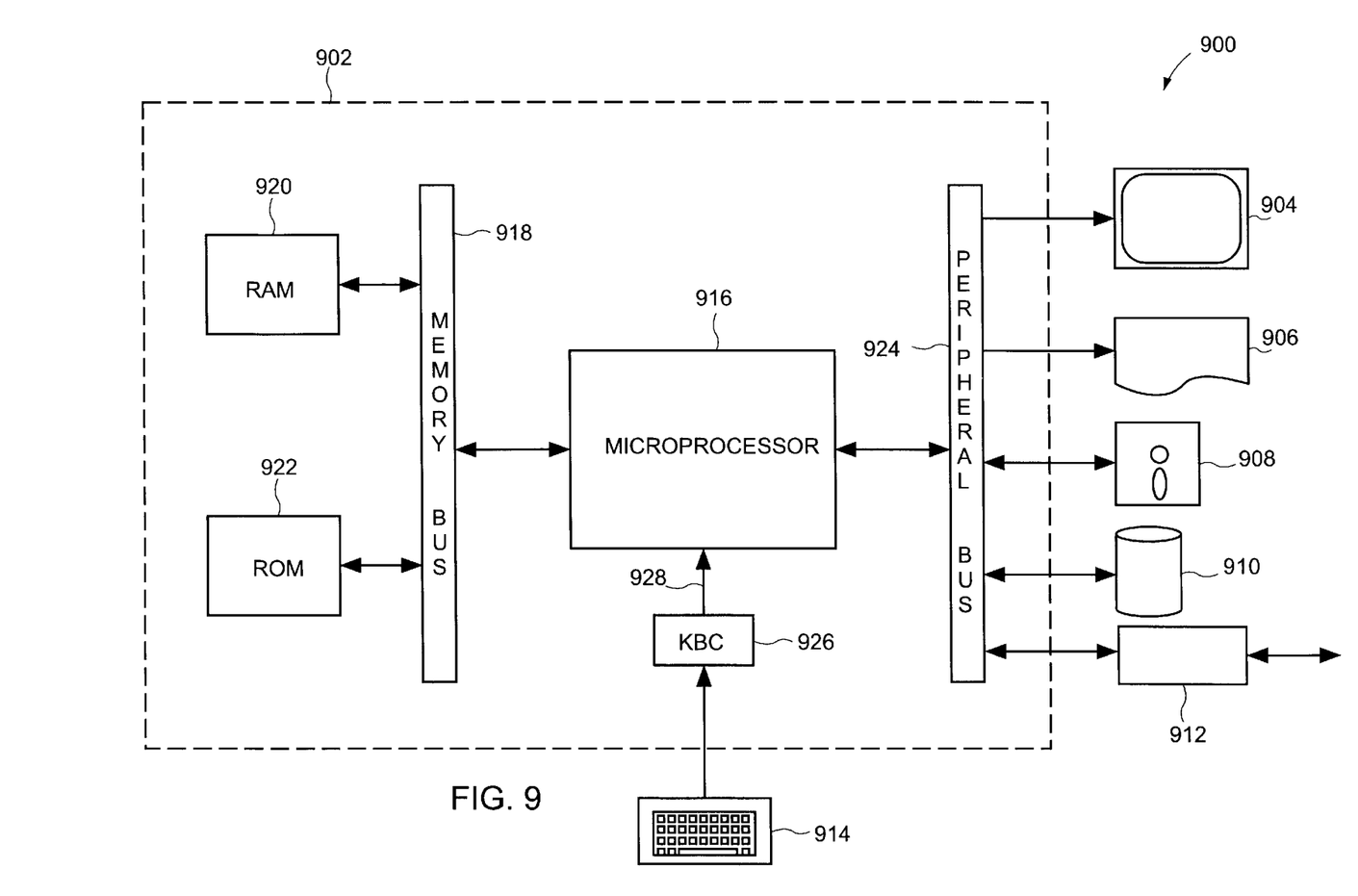
FIG. 9 is a block diagram of an exemplary computer system for carrying out some of the processing according to the invention.

FIG. 9 is a block diagram of an exemplary computer system 900 for carrying out the processing according to the invention. The computer system 900 includes a digital computer 902, a display screen (or monitor) 904, a printer 906, a floppy disk drive 908, a hard disk drive 910, a network interface 912, and a keyboard 914. The digital computer 902 includes a microprocessor 916, a memory bus 918, random access memory (RAM) 920, read only memory (ROM) 922, a peripheral bus 924, and a keyboard controller 926. The digital computer 900 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 916 is a general purpose digital processor which controls the operation of the computer system 900. The microprocessor 916 can be a single-chip processor or can be implemented with multiple components. Using instructions retrieved from memory, the microprocessor 916 controls the reception and manipulation of input data and the output and display of data on output devices. According to the invention, a particular function of microprocessor 916 is to assist in the address location and positioning computations.

The memory bus 918 is used by the microprocessor 916 to access the RAM 920 and the ROM 922. The RAM 920 is used by the microprocessor 916 as a general storage area and as scratch-pad memory, and can also be used to store input data and processed data. The ROM 922 can be used to store instructions or program code followed by the microprocessor 916 as well as other data.

The peripheral bus 924 is used to access the input, output, and storage devices used by the digital computer 902. In the described embodiment, these devices include the display screen 904, the printer device 906, the floppy disk drive 908, the hard disk drive 910, and the network interface 912. The keyboard controller 926 is used to receive input from keyboard 914 and send decoded symbols for each pressed key to microprocessor 916 over bus 928.

The display screen 904 is an output device that displays images of data provided by the microprocessor 916 via the peripheral bus 924 or provided by other components in the computer system 900. The printer device 906 when operating as a printer provides an image on a sheet of paper or a similar surface. Other output devices such as a plotter, typesetter, etc. can be used in place of, or in addition to, the printer device 906.

The floppy disk drive 908 and the hard disk drive 910 can be used to store various types of data. The floppy disk drive 908 facilitates transporting such data to other computer systems, and hard disk drive 910 permits fast access to large amounts of stored data.

The microprocessor 916 together with an operating system operate to execute computer code and produce and use data. The computer code and data may reside on the RAM 920, the ROM 922, or the hard disk drive 910. The computer code and data could also reside on a removable program medium and loaded or installed onto the computer system 900 when needed. Removable program mediums include, for example, CD-ROM, PC-CARD, floppy disk and magnetic tape.

The network interface 912 is used to send and receive data over a network connected to other computer systems. An interface card or similar device and appropriate software implemented by the microprocessor 916 can be used to connect the computer system 900 to an existing network and transfer data according to standard protocols.

The keyboard 914 is used by a user to input commands and other instructions to the computer system 900. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Therefore, although the present invention has been described with reference to hard drives, the inventive techniques used to identify an exact address of retrieved data may also apply to custom formatted optical drives and the like. Therefore, the present invention should also be applicable to any mass storage device, such as, but not limited to, optical storage media and tape storage media. Accordingly, the present embodiments are to be considered as illustrative and not restrictive, and the invention is not to be limited to the details given herein, but may be modified within the scope and equivalents of the appended claims.

What is claimed is:

1. A method for determining an exact address of sectors retrieved from a media that is formatted in a headerless format, comprising:
   requesting a desired sector;
   associating a seed value to the desired sector;
   retrieving an initial sector from the media in response to the requested desired sector;
   calculating an error detection and correction over the initial sector and the seed value that is associated with the desired sector to produce a seed error pattern; and
   performing a logical XOR operation between the seed error pattern and the seed value to produce an exact address of the initial sector that is retrieved from the media.

2. A method for determining an exact address of sectors retrieved from a media that is formatted in a headerless format as recited in claim 1, wherein the error detection and correction over the initial sector and the seed value that is associated with the desired sector initially produces a seed error that is used to compute a seed error location.

3. A method for determining an exact address of sectors retrieved from a media that is formatted in a headerless format as recited in claim 2, wherein the seed error location is used to compute the seed error pattern that is used in the logical XOR operation.

4. A method for determining an exact address of sectors retrieved from a media that is formatted in a headerless format as recited in claim 3, wherein the initial sector includes a data section and an ECC section.

5. A method for determining an exact address of sectors retrieved from a media that is formatted in a headerless format as recited in claim 4, further comprising:
   transitioning from the exact address of the initial sector to an address of the desired sector.

6. A method for determining an exact address of sectors retrieved from a media that is formatted in a headerless format as recited in claim 4, further comprising:
   verifying that a produced error location is associated with the seed error.

7. A method for determining an exact address of sectors retrieved from a media that is formatted in a headerless format as recited in claim 6, further comprising:
   referring to an error correction code word that contains an information portion and a check byte portion; and
   examining the information portion to determine whether the produced error location is associated with the seed error.

8. A method for determining an exact address of sectors retrieved from a media that is formatted in a headerless format as recited in claim 7, wherein a data error occurs when the produced error location is not associated with the seed error.

9. A method for determining an exact address of sectors retrieved from a media that is formatted in a headerless format as recited in claim 8, wherein when the data error occurs, the data error is fixed before being communicated to a buffer controller.

10. A method for determining an exact address of sectors retrieved from a media that is formatted in a headerless format as recited in claim 2, wherein the calculating the error detection and correction further comprises:
    calculating a syndrome for the seed error.

11. A method for determining an exact address of sectors retrieved from a media that is formatted in a headerless format as recited in claim 1, further comprising:
    storing sectors read from the media in cache memory beginning with the exact address of the initial sector that is retrieved from the media, such that a sector having a desired address is stored within the cache memory.

12. A method for determining an exact address of sectors retrieved from a media that is formatted in a headerless format as recited in claim 11, further comprising:
    retrieving a plurality of sectors from the cache memory beginning with the sector having the desired address.

13. A method for determining an exact address of sectors retrieved from a media that is formatted in a headerless format as recited in claim 12, further comprising:
    transferring the plurality of sectors from the cache memory beginning with the sector having the desired address to a requesting host.

14. A method for determining an exact address of sectors retrieved from a media that is formatted in a headerless format as recited in claim 1, wherein an integrated circuit chip is contains logic for performing the determination of the exact address of sectors retrieved from the media.

15. A hard disk drive having a media for storing a plurality of sectors that include a data portion and an ECC portion, comprising:
    a disk drive controller configured to receive a request for a desired sector that has an associated seed value that corresponds to a desired sector address in the media;
    a microcontroller configured to command a motor control to retrieve an initial sector from the media in response to the request for the desired sector from disk drive controller; and
    an error detection and correction controller that is part of the disk drive controller, the error detection and correction controller being configured to perform an error detection and correction over the initial sector and the seed value to produce a seed error that is transformed into a seed error pattern, and the error detection and correction controller further being configured to perform an XOR operation between the seed value and the seed error pattern to produce an exact address of the initial sector that is retrieved from the media.

16. A hard disk drive having a media for storing a plurality of sectors as recited in claim 15, wherein the seed error is first transformed into an error location before being transformed into the seed error pattern.

17. A hard disk drive having a media for storing a plurality of sectors as recited in claim 16, further comprising:
    a servo chip being in communication with the motor control, the servo chip being configured to perform indexing and sector pulse searching or servo split searching to locate the initial sector from the media.

18. A hard disk drive having a media for storing a plurality of sectors as recited in claim 17, wherein the disk drive controller command a transition from the exact address of the initial sector to an address of the desired sector in the media.

19. A hard disk drive having a media for storing a plurality of sectors as recited in claim 18, wherein the disk drive controller includes an ECC controller for performing the XOR operation between the seed value and the seed error pattern.

20. A hard disk drive having a media for storing a plurality of sectors as recited in claim 19, wherein the disk drive controller includes a buffer controller that is coupled to the ECC controller, and a microcontroller interface logic that is within the disk drive controller.

21. A hard disk drive having a media for storing a plurality of sectors as recited in claim 20, wherein the buffer controller of the disk drive controller is coupled to a cache memory used for storing sector data.

22. A hard disk drive having a media for storing a plurality of sectors as recited in claim 21, wherein the disk drive controller includes a read channel chip for performing conversions between analog and digital formats, the read channel chip being coupled to the servo chip, the motor control chip, the disk drive controller chip and a disk drive arm that is used to access the media.

23. A computer readable media containing program instructions for determining an exact address of sectors retrieved from a media that is formatted in a headerless format, the computer readable media comprising:

program instructions for requesting a desired sector;

program instructions for associating a seed value to the desired sector;

program instructions for retrieving an initial sector from the media in response to the requested desired sector;

program instructions for calculating an error detection and correction over the initial sector and the seed value that is associated with the desired sector to produce a seed error pattern; and program instructions for performing a logical XOR operation between the seed error pattern and the seed value to produce an exact address of the initial sector that is retrieved from the media.

24. A computer readable media containing program instructions for determining an exact address of sectors retrieved from a media that is formatted in a headerless format as recited in claim 23, wherein the program instructions for calculating the error detection and correction over the initial sector and the seed value that is associated with the desired sector initially produces a seed error that is used to compute a seed error location.

25. A computer readable media containing program instructions for determining an exact address of sectors retrieved from a media that is formatted in a headerless format as recited in claim 24, wherein the seed error location is used to compute the seed error pattern that is used in the logical XOR operation.

26. A computer readable media containing program instructions to be executed on a central processing unit for determining an exact address of sectors retrieved from a media that is formatted in a headerless format, the computer readable media comprising:

providing syndrome values of a seed error that is produced when an initial sector that is other than a desired sector is retrieved from the media;

providing a seed value that is associated with the desired sector;

program instructions for receiving the provided syndrome values and the seed value;

program instructions for calculating an error detection and correction over the initial sector that includes a data portion and an ECC portion and the provided seed value that is associated with the desired sector to produce a seed error pattern; and program instructions for performing a logical XOR operation between the seed error pattern and the seed value to produce an exact address of the initial sector that is retrieved from the media.

27. A computer readable media containing program instructions for determining an exact address of sectors retrieved from a media that is formatted in a headerless format as recited in claim 26, wherein the program instructions for calculating the error detection and correction over the initial sector and the seed value that is associated with the desired sector initially produces a seed error that is used to compute a seed error location.

28. A computer readable media containing program instructions for determining an exact address of sectors retrieved from a media that is formatted in a headerless format as recited in claim 27, wherein the seed error location is used to compute the seed error pattern that is used in the logical XOR operation.

29. A computer readable media containing program instructions to be executed on a central processing unit for determining an exact address of sectors retrieved from a media that is formatted in a headerless format, wherein a data portion and an ECC portion of an initial sector, and a seed value that is associated with the desired sector are made accessible to the central processing unit, the computer readable media comprising:

program instructions for calculating syndrome values using the data portion and the ECC portion of an initial sector;

program instructions for calculating an error detection and correction over the initial sector that includes the data portion and the ECC portion, and the seed value that is associated with the desired sector to produce a seed error pattern; and program instructions for performing a logical XOR operation between the seed error pattern and the seed value to produce an exact address of the initial sector that is retrieved from the media.

30. A method for determining an exact address of a sector retrieved from a headerless media, comprising:

retrieving a sector having a data section and an ECC section from the media;

performing an error detection and correction over the sector;

producing an error from the performed error detection and correction;

calculating an error location for the produced error;

calculating an error pattern from the calculated error location, the error pattern being the exact address of the sector retrieved from the headerless media.

* * * * *